April 24, 1945.  H. J. DE N. McCOLLUM  2,374,606
AIRCRAFT HEATING SYSTEM
Filed March 7, 1942  2 Sheets-Sheet 2
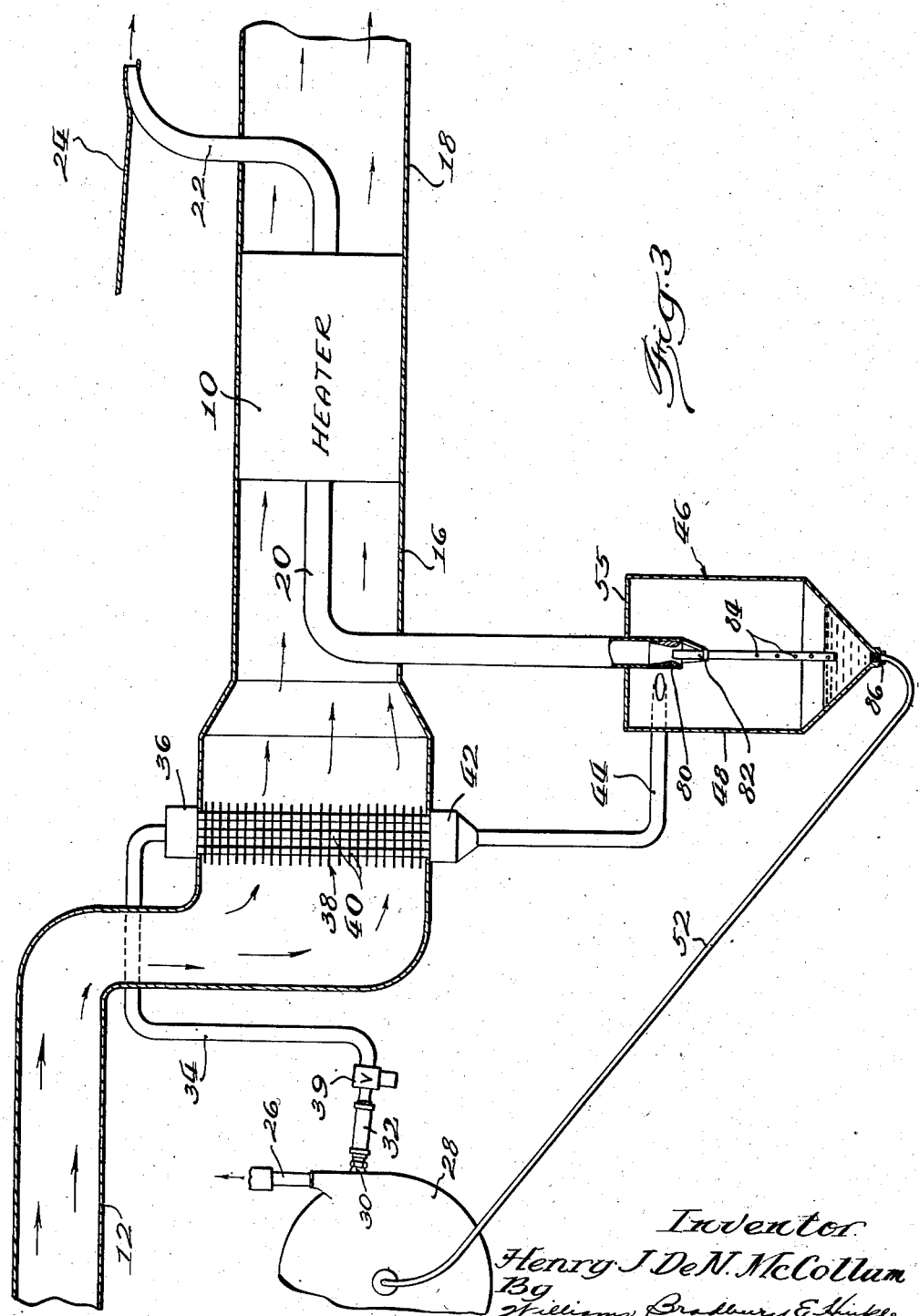
Inventor
Henry J. DeN. McCollum
By Williams, Bradbury & Hinkle
Att'ys Patented Apr. 24, 1945

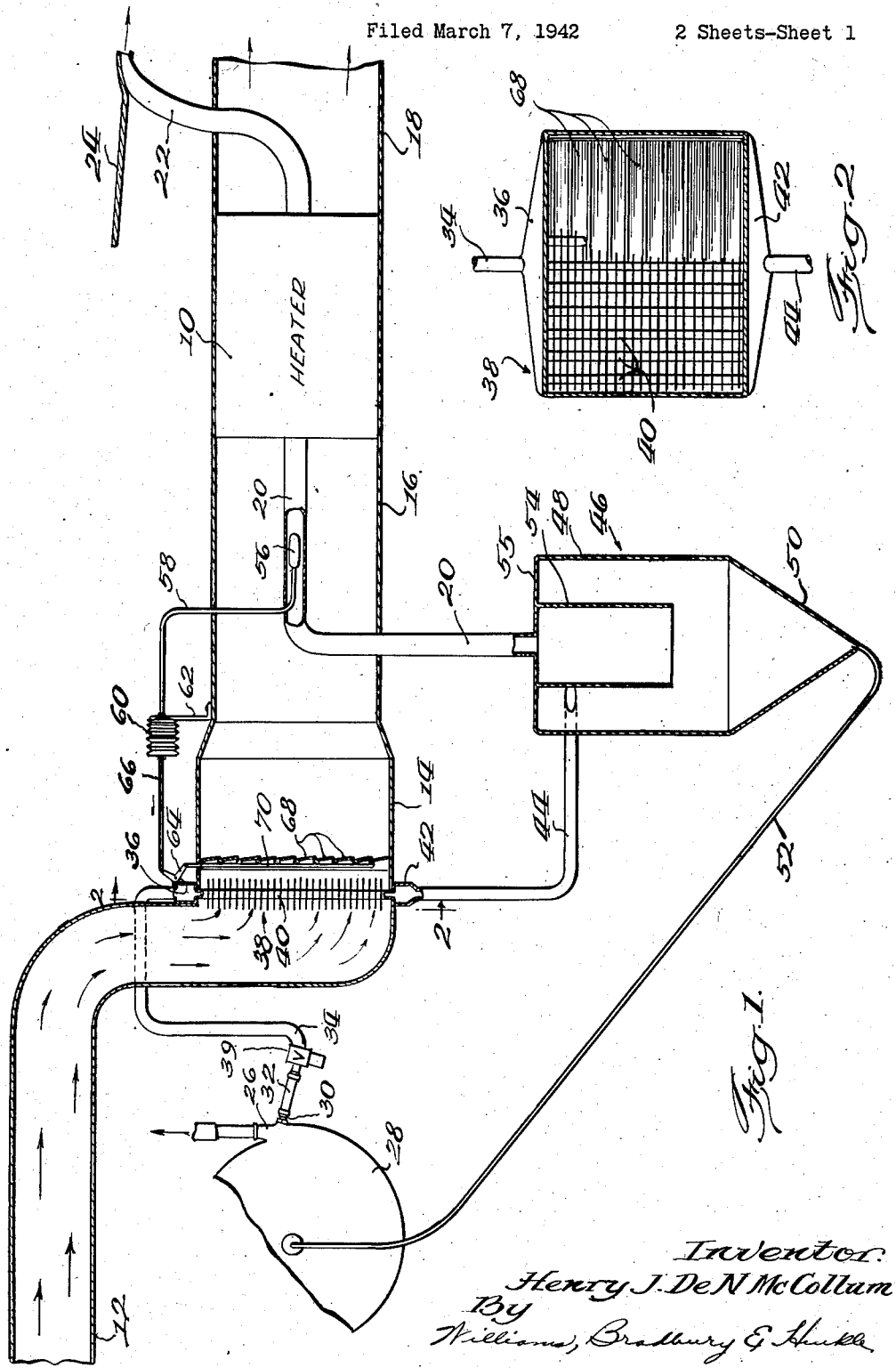

2,374,606

UNITED STATES PATENT OFFICE 2,374,606

AIRCRAFT HEATING SYSTEM

Henry J. De N. McCollum, Chicago, Ill.; Thelma McCollum executrix of said Henry J. De N. McCollum, deceased Application March 7, 1942, Serial No. 433,728

14 Claims. (Cl. 237—2)

My invention relates generally to aircraft heating apparatus, and more particularly to combustible mixture control means for aircraft heaters of the internal combustion type.

In aircraft heating systems using heaters of the internal combustion type, the combustible mixture for the heater is frequently drawn from the engine fuel mixture supply system, usually from the high pressure side of the supercharger which draws the mixture from the carburetor and forces it to the engine cylinders. This mixture is frequently too rich for satisfactory complete combustion in the heater. It is the primary object of my invention to provide means for controlling the richness of the mixture supplied to the heater in a heating system of this character.

A further object is to provide improved means for removing excess fuel from a mixture of fuel and air supplied to an internal combustion type heater.

A further object is to provide a simple and effective means for accurately regulating the fuel mixture supplied to a heater, and thereby improve the effectiveness of its operation under a wide variety of operating conditions.

Other objects will appear from the following description, reference being had to the accompanying drawings, in which:

Fig. 1 is a partly sectional diagrammatic view of the heating system;

Fig. 2 is a vertical sectional view taken on the line 2—2 of Fig. 1; and

Fig. 3 is a schematic view of a modified form of the invention.

The heater, which may be of the single unit type shown in my copending application, Serial No. 378,262, filed February 10, 1941, and as indicated by the heater casing 10, or may be of the multiple unit type shown in my copending application, Serial No. 377,182, filed February 3, 1941. As shown, the heater casing 10 forms a part of an air supply conduit having a ram portion 12, a condenser and shutter chamber 14, a connecting section 16, and a delivery section 18, leading to the pilots' compartment and to any other portion of the aircraft requiring a supply of heated air.

The heater 10 is provided with a combustible mixture intake pipe 20 and a discharge pipe 22 leading overboard of the fuselage 24 preferably at a point at which a partial vacuum exists.

The combustible mixture for the heater 10 is drawn from the discharge pipe 26 of a supercharger 28 through a fitting 30, which extends into the pipe 26 beyond the inner wall thereof, as shown in detail in my copending application, Serial No. 410,037, filed September 8, 1941. A short length of flexible hose 32 connects the fitting 30 with a conduit 34, which leads to the upper header 36 of a condenser 38.

The flow of the mixture through the conduit 34 may be controlled by a valve 39 which may be manually or electromagnetically operated. The condenser 38 comprises a plurality of tubes 40 connecting its upper header 36 with its lower header 42.

The lower header 42 is connected by a conduit 44 with a separator 46, the conduit 44 entering the upper cylindrical shell portion 48 tangentially. The lower portion of the separator is formed by a conical funnel portion 50. A conduit 52 connects the bottom of the portion 50 with the reduced pressure side of the supercharger 28. A cylindrical skirt 54 depends from the top 55 of the separator 46, and the space within this skirt is in free communication with the intake pipe 20.

Within the intake pipe 20 is located a bulb 56, which is connected by conduit 58 with an expansible metal bellows 60. One end of the bellows 60 is secured to a suitable fixed bracket 62, while the movable end of the bellows is connected to one arm of a suitable pivoted bell crank 64 by a rod 66. The other arm of the bell crank 64 is connected to a plurality of pivotally mounted shutters 68 by an actuating link 70.

The bulb 56 contains a suitable volatile liquid, such as ether, alcohol, etc., or a mixture thereof, which, upon being raised to a predetermined temperature, generates sufficient vapor pressure to open the shutters 68, opening them to increasing extents as the temperature of the mixture flowing through intake pipe 20 increases. The bulb 56 and bellows 60 are intended as illustrative of any suitable temperature responsive motor means for operating the shutters 68.

The heating system will generally be operated only when the atmospheric temperature is relatively low. On the other hand, the fuel and air mixture suplied to the upper header 36 will generally be considerably warmer than the atmosphere, due to the agitation and compression effected in the supercharger 28.

Depending upon the design of heater 10, upon the grade of fuel used, and upon the character of the operation of the thermostatic controls, it will usually be desirable to have the thermostatic controls designed to maintain the mixture in the intake pipe 20 at a temperature in the order of 20° F. A saturated mixture at this temperature burns completely and efficiently in the heater 10.

The heater 10 is provided with the usual electrical ignition and control means. Assuming that the controls have been operated to start the heater, by opening valve 39 and energizing the heater ignition means, the usually supersaturated mixture of gasoline and air at a temperature above 20° F. flows through the condenser 38 which is cooled by the cool atmospheric air entering the ram 12. The rate at which the cooling air flows through the condenser 38 is regulated by the thermostatically controlled shutters 68 so as to cool the fuel mixture to a temperature in the order of 20° F. with the result that some of the fuel vapor will condense and flow with the saturated mixture to the separator 46.

The separation of the liquid fuel from the vapor and air mixture is facilitated by the centrifugal action induced by the tangential inlet to the separator. The separated liquid fuel is drawn from the bottom of the separator 46 through the conduit 52 and is returned to the low pressure side of the supercharger 28. The conduit 52 is of such diameter that it will easily carry all of the condensed fuel under all conditions of operation, but will not withdraw an appreciable portion of the fuel vapor and air mixture from the separator 46. Thus, a float-controlled valve at the liquid outlet of the separator 46 will ordinarily not be necessary.

The mixture of fuel vapor and air, with a minimum of entrained liquid particles, will flow through the conduit 20 to the combustion chamber of the heater 10 where it is ignited and burns in the usual manner to heat the air supplied to it through the connecting section 16, the heated air being discharged through the delivery section 18 to the cabin and other parts of the aircraft to be supplied with heated air. The products of combustion are discharged through the conduit 22, the partial vacuum existing at the outlet of this conduit assisting in such flow.

The air supplied to the heater is preheated to some extent by passing the tubes 40 of the condenser 38. The system is illustrated as having all of the air to be heated pass through the condenser chamber 14. With proper proportioning of the heat exchange area of the condenser 38 with respect to the heat delivery capacity of the heater 10, it will be apparent that the shutters 68 are not only effective to maintain the temperature of the fuel mixture at a relatively constant value, but also at the same time control the rate of flow of air to the heater. These two functions of the thermostatically controlled shutters are mutually conducive to satisfactory operation of the system because as the atmospheric temperature drops, a lower rate of air flow through the condenser is required and at the same time the air flow through the heater should be reduced to permit the heater, with its relatively constant heat delivery capacity, to heat the air discharged from the heater to the required temperature.

In certain installations and under certain operating conditions, it may be desirable to pass through the condenser chamber 14, only a portion of the air to be heated, and it is within the contemplation of my invention to thus construct the apparatus that a portion of the air to be heated by-passes the condenser 38 and the control shutters.

The modified form of the invention shown in Fig. 3, includes many of the elements shown in Fig. 1, and the same reference characters have been applied to corresponding parts. The modification of Fig. 3 is simpler than the system shown in Fig. 1, in that the thermostatically controlled shutters are not required. Instead, the intake pipe 20 for the heater projects into the shell 48 of the separator 46, and has a Venturi nozzle 80 formed at the end thereof. A fuel jet tube 82 is suitably secured to the Venturi nozzle 80, and has its open end substantially at the throat thereof. The jet tube 82 has a plurality of minute orifices 84 formed therein at spaced intervals. The conduit 52 leading from the bottom of the separator 46 has an orifice plug 86 secured therein. The orifice in this plug may be of predetermined size or may be in the form of a needle valve controlled orifice.

The orifice 86 is of such size that the liquid fuel will tend to collect in the bottom of the separator 46. The cooling air flowing past the condenser 38, not being controlled by shutters, will, under most conditions of operations at high altitudes, when the atmospheric temperature is very low, condense a relatively large proportion of the liquid fuel from the mixture. Since the orifice in the plug 86 will be chosen of such diameter that all of the condensed fuel will not be drawn through the return conduit 52 to the supercharger, the accumulated liquid fuel in the separator 46 will rise to a level generally dependent upon the atmospheric temperature. That is, when the atmospheric temperature is low, the level of the accumulated liquid fuel in the separator 46 will be high, and vice versa.

When the level of the liquid fuel in the separator 46 is high, a substantial quantity will be drawn through the orifices 84 in the fuel jet tube 82, and thus again mixed with the air and fuel vapor mixture drawn through the Venturi nozzle 82, under these circumstances enriching the mixture sufficiently to insure efficient combustion within the heater 10. Conversely, when the atmospheric temperature is high, and the liquid level in the separator 46 relatively low, a large number of the orifices 84 will be uncovered so that the air and vapor mixture may be drawn therethrough and into the fuel jet tube 82 with a lesser quantity of liquid fuel. The amount of liquid fuel added to the mixture passing through the Venturi nozzle 80, will thus increase as the temperature decreases, and thereby automatically compensate for the reduced amount of fuel vapor mixed with the air entering the Venturi nozzle 80 at low temperatures. The fuel mixture is thus maintained sufficiently uniform for satisfactory combustion, irrespective of the atmospheric temperature, and this result is accomplished without the necessity of providing any thermostatic controls or comparable means for regulating the amount of cooling air passing through the condenser 38.

Instead of having the orifices 84 of equal size, and equally spaced along the fuel jet tube 82, they may be of graduated size and spacing, so as to obtain the desired proportion of fuel in the mixture supplied to the heater at different atmospheric temperatures. Instead of a fixed orifice in the plug 86, an adjustable orifice may be provided to accomplish similar results.

The apparatus of Fig. 3 has the particular advantage that it does not have any moving parts which may fail to operate properly at all times under the severe conditions encountered in operating aircraft at high altitudes.

Thus, while I have shown and described particular embodiments of my invention, it will be clear to those skilled in the art that numerous variations and alterations in the system may be made without departing from the more fundamental principles of the invention. I therefore desire, by the following claims, to include within the scope of my invention all such variations and modifications by which substantially the results of my invention may be obtained by the use of substantially the same or equivalent means.

I claim:

1. In a heating system for aircraft driven by an internal combustion engine having a device for supplying a combustible mixture of a normally liquid fuel and air thereto, the combination of an internal combustion type heater, a conduit for supplying combustible mixture from said device to said heater, means to maintain a portion of said conduit at a relatively constant temperature, and means to remove unevaporated liquid fuel from said mixture after it has passed through said portion of said conduit.

2. In a heating system for aircraft having an internal combustion engine and carbureting means normally supplying a rich mixture thereto, a heater of the internal combustion type, conduit means to supply a mixture of normally liquid fuel and air withdrawn from said carbureting means to said heater, means forming a portion of said conduit for maintaining the mixture passing therethrough at a predetermined relatively constant temperature, and means for removing unvaporized fuel from said mixture while the mixture is at said predetermined temperature.

3. The method of providing a relatively constant proportion fuel mixture to an internal combustion type heater, in which the heater is supplied with relatively cold ventilating air, which comprises, cooling a relatively rich mixture of fuel and air to a predetermined temperature by means of the ventilating air supply for the heater and thus preheating such ventilating air, removing fuel condensed from the mixture while it is at said temperature, and supplying the remaining fuel vapor and air mixture to the heater.

4. In a heating system having a heater of the internal combustion type, the combination of a fuel supply apparatus comprising a source of a relatively rich mixture of fuel and air, a condenser, a separator, conduits connecting said source, said condenser, and said separator in series, a cooling medium supply for said condenser comprising the ventilating air supply for the heater, and means responsive to the temperature of said mixture after it leaves said condenser to control the rate of supply of the cooling medium to said condenser to maintain the mixture at a relatively constant temperature.

5. In an aircraft heating system for use in an aircraft having an internal combustion type heater, an internal combustion engine and a supercharger supplying a combustible mixture of fuel and air to the engine, the combination of a heat exchange device, means for supplying a cooling medium to said device, a liquid trap, conduits conducting fuel and air from the high pressure side of said supercharger to said heat exchange device and from said device into said liquid trap, a conduit connecting the bottom of said liquid trap with the low pressure side of said supercharger, and means for conveying a mixture of vaporized fuel and air from said trap to the heater.

6. The combination set forth in claim 5, including means responsive to the temperature at which the mixture of vaporized fuel and air is supplied to the heater to regulate the rate of supply of the cooling medium to said heat exchange device.

7. The combination set forth in claim 5 in which shutters are provided to control the rate of flow of the cooling medium through said heat exchange device, and in which a termostatic motor responsive to the temperature of the fuel vapor and air mixture supplied to the heater is connected to operate said shutters to increase the rate of supply of the cooling medium as the temperature of said mixture increases, and vice versa.

8. In a heating system having an internal combustion engine and carbureting means normally supplying a rich mixture thereto, the combination of a heater of the internal combustion type capable of burning a mixture of liquid fuel and air, means for withdrawing a portion of the mixture supplied by said carbureting means, a heat exchange device for cooling the mixture withdrawn from said carbureting means and condensing an appreciable portion of the vaporized liquid fuel contained in the mixture, a separator to separate the condensed liquid fuel from the air and vaporized fuel mixture, means to withdraw at a relatively constant rate the condensed liquid fuel collected in said separator, means for conveying the vaporized fuel and air from the said separator to said heater, and means for adding to said mixture liquid fuel from said separator at a predetermined rate dependent upon the level of the condensed liquid fuel in said separator.

9. In an aircraft heating system having a heater of the internal combustion type, the aircraft having an internal combustion engine and a carbureting means therefor comprising a source of a relatively rich mixture of liquid fuel and air at a relatively high temperature, a heat exchange device receiving the mixture from said source, means for supplying a cooling medium to said heat exchanger to reduce the temperature of said mixture and cause substantial condensation of the fuel, a liquid trap connected to said heat exchange device to receive the mixture and condensed liquid fuel therefrom, means for withdrawing the liquid fuel from said trap at a relatively constant rate, whereby the liquid level within said trap will be in part determined by the rate of condensation of liquid fuel in said heat exchange device, a conduit including a restricted throat nozzle leading from said trap to said heater for conveying a fuel mixture to the latter, and a tube extending from the throat of said nozzle to a point adjacent the bottom of said trap, said tube having a plurality of orifices spaced along the length thereof, whereby liquid fuel in amount dependent upon the liquid fuel level in said trap will be drawn through said tube by the suction created at the throat of said nozzle and added to the fuel mixture supplied to said heater.

10. The method of supplying a combustible mixture of fuel and air to a heater of the internal combustion type from the carbureting means of an aircraft internal combustion engine, the carbureting means being a source of excessively rich mixture which comprises, reducing the temperature of the rich mixture to a value sufficient to cause condensation of the excess fuel in the mixture, separating the excess liquid fuel from the remainder of the mixture, and supplying said remaining mixture to the heater for combustion therein.

11. The method of supplying a combustible mixture of fuel and air to a heater of the internal combustion type from the aircraft engine carbureting means which constitutes a source of excessively rich mixture which comprises, reducing the temperature of the rich mixture sufficiently to cause condensation of some of the fuel from the mixture, separating the liquid fuel from the remainder of the mixture, supplying said remaining mixture to the heater for combustion therein, and adding liquid fuel to the mixture supplied to the heater at a rate increasing with an increase in the rate at which the fuel is condensed.

12. In an aircraft heating system having a heater of the internal combustion type, the aircraft having an internal combustion engine and a carbureting means, the latter constituting a source of a relatively rich mixture of liquid and vaporized liquid fuel and air at a relatively high temperature, a heat exchange device receiving the mixture from said means, means for supplying a cooling medium to said heat exchanger to reduce the temperature of said mixture and cause substantial condensation of the fuel, a liquid trap connected to said exchange device to receive the mixture and condensed liquid fuel therefrom, means for withdrawing the liquid fuel from said trap at a relatively constant rate, whereby the liquid level within said trap will be in part determined by the rate of condensation of liquid fuel in said heat exchange device, a conduit leading to said heater from said trap at a point above the liquid level therein for conveying a vaporized fuel and air mixture to the heater, and means responsive to the level of the liquid fuel in said trap to supply liquid fuel to the mixture in said conduit at a rate increasing as the level of the liquid fuel in said trap is raised.

13. In an aircraft heating system for use in an aircraft having an internal combustion engine and a supercharger for supplying a combustible mixture to the engine, the combination of a heat exchange device, means for supplying a cooling medium to said device, a liquid trap, conduits leading from the high pressure side of said supercharger through said heat exchange device and into said liquid trap, a conduit connecting the bottom of said liquid trap with the low pressure side of said supercharger, means for conveying a mixture of vaporized fuel and air from said trap to the heater, and means for adding liquid fuel from said trap to the mixture conveyed to the heater.

14. The combination set forth in claim 13 in which the means for adding the liquid fuel to the mixture conveyed to the heater operates to supply the liquid fuel at an increased rate as the liquid fuel level in said trap increases.

HENRY J. DE N. McCOLLUM.